US009252905B2

(12) United States Patent
Hu et al.

(10) Patent No.: US 9,252,905 B2
(45) Date of Patent: Feb. 2, 2016

(54) ANTENNA RESOURCE MANAGEMENT FOR MULTI-ANTENNA STRUCTURE (71) Applicant: TELEFONAKTIEBOLAGETL M ERICSSON (publ), Stockholm (SE)

(72) Inventors: Kathy Hu, Beijing (CN); Licong Huang, Beijing (CN); Mary Liang, Beijing (CN); Field Liu, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 72 days.

(21) Appl. No.: 13/625,660

(22) Filed: Sep. 24, 2012

(65) Prior Publication Data

US 2014/0086071 A1    Mar. 27, 2014

(51) Int. Cl.
*H04B 7/06* (2006.01)
*H04J 3/14* (2006.01)
*H04W 24/00* (2009.01)
*H04B 7/08* (2006.01)

(52) U.S. Cl.
CPC ............... *H04J 3/14* (2013.01); *H04B 7/0604* (2013.01); *H04B 7/0617* (2013.01); *H04B 7/0689* (2013.01); *H04W 24/00* (2013.01); *H04B 7/0691* (2013.01); *H04B 7/0802* (2013.01); *H04B 7/086* (2013.01); *H04B 7/0871* (2013.01); *H04B 7/0874* (2013.01)

(58) Field of Classification Search
CPC combination set(s) only.
See application file for complete search history.

(56) References Cited

U.S. PATENT DOCUMENTS

| | | | |
|---|---|---|---|
| 6,496,142 B1 | 12/2002 | Iinuma | |
| 7,302,261 B2* | 11/2007 | Rajkotia et al. | 455/434 |
| 7,515,555 B2* | 4/2009 | Ishidoshiro | 370/310 |
| 8,310,947 B2* | 11/2012 | Hwang | 370/252 |
| 8,428,530 B1* | 4/2013 | Nabar et al. | 455/179.1 |
| 8,583,197 B2* | 11/2013 | Rofougaran | 455/575.7 |
| 2007/0070939 A1* | 3/2007 | Hottinen | 370/328 |
| 2009/0034639 A1 | 2/2009 | Hwang et al. | |
| 2009/0186585 A1 | 7/2009 | Ahrony et al. | |
| 2009/0290657 A1* | 11/2009 | Howard et al. | 375/267 |
| 2010/0238869 A1 | 9/2010 | Bruin et al. | |
| 2010/0309781 A1* | 12/2010 | Wang et al. | 370/229 |
| 2012/0287797 A1* | 11/2012 | Basson et al. | 370/252 |
| 2013/0051261 A1* | 2/2013 | Kazmi et al. | 370/252 |

OTHER PUBLICATIONS

3GPP TS 36.211, "3$^{rd}$ Generation Partnership Project; Technical Specification Group Radio Access Network; Evolved Universal Terrestrial Radio Access (E-UTRA); Physical Channels and Modulation (Release 8)," V8.6.0, Mar. 2009.
3GPP TS 36.212, "3$^{rd}$ Generation Partnership Project; Technical Specification Group Radio Access Network; Evolved Universal Terrestrial Radio Access (E-UTRA); Multiplexing and Channel Coding (Release 8)," V8.6.0, Mar. 2009.

(Continued)

*Primary Examiner* — Fan Ng
(74) *Attorney, Agent, or Firm* — Patent Portfolio Builders, PLLC (57) ABSTRACT

A radio network node antenna management system dynamically manages a multi-antenna structure (200). The multi-antenna structure (200) includes a set of n antennas with beamforming capability. The antenna management system monitors a condition in a radio network cell served by the radio network node. If the monitored condition is less than or equal to a predetermined criteria, a beamforming operation is disabled and a subset, less than n, of the set of n antennas is managed according to a predetermined antenna hopping pattern.

29 Claims, 7 Drawing Sheets (56) References Cited

OTHER PUBLICATIONS

3GPP TS 36.213 3$^{rd}$ Generation Partnership Project; Technical Specification Group Radio Access Network; Evolved Universal Terrestrial Radio Access (E-UTRA); Physical Layer Procedures (Release 8), V8.6.0, Mar. 2009.
International Search Report issued in Application No. PCT/IB2013/058585 dated Feb. 21, 2014.

* cited by examiner

ANTENNA RESOURCE MANAGEMENT FOR MULTI-ANTENNA STRUCTURE

TECHNICAL FIELD

The technology relates to radio signal transmission systems using multi-antenna structures. More specifically, the technology relates to a multi-antenna structure and methods of management thereof, e.g., for reducing power and resource consumption. Non-limiting example applications of the technology include telecommunication systems, such as those implementing standards like GSM, WCDMA, LTE or any other standard or combinations thereof.

BACKGROUND

Radio signal transmission systems typically use single or small antenna groups to properly transmit/receive radio signals. Multi-antenna technology can improve space resource utilization, increase radio channel bandwidth efficiency, and improve system capacity. Compared with traditional antenna techniques, multiple-input and multiple-output, or MIMO, antennas systems use multiple antennas at both the transmitter and receiver to improve communication performance. MIMO technology has an advantage of improving channel capacity. Two antenna MIMO technology has been widely used, for example a macro node (eNodeB) using two antennas to transmit downlink (DL) signals and receive uplink signals (UL).

In long term evolution (LTE) communication systems, two different frame structures exist. Of the two, frame type-2 structures are applicable to time division duplex (TDD), and at least for LTE high speed data transmission, may require a high resource usage rate.

Interference between users is a concern in LTE systems, not only at the edge of cell, but also in the cell. To reduce this interference, beamforming smart antenna techniques are used, e.g., within time division synchronous code division multiple access (TD-SCDMA) systems and may effectively reduce interference between users and provide interference coordination capability. Beamforming is a signal processing technique used to directionally shape antenna transmission patterns to avoid interference. Recently, for example, eight antenna beamforming smart antenna technology has been introduced into the TDD-LTE system. The eight antenna beamforming smart antenna technology makes it is easier to upgrade TD-SCDMA systems to TDD-LTE resulting in reduced network construction.

The 3rd Generation Partnership Project (3GPP) provides technical specifications for a 3rd generation mobile system based on evolved Global System for Mobile Communications (GSM) core networks. In 3GPP, release 8, there are seven transmission modes in an LTE system, every transmission mode related to a different radio condition and scenario. A specific transmission mode is defined to support beamforming in TDD-LTE. The other transmission modes are single-input and single-output system (SISO), transmission diversity, MIMO and multi-user MIMO (MU-MIMO).

In 3GPP release 8, a one-layer beamforming smart antenna is used, eight antennas sending and two antennas receiving (8×2). In 3GPP release 9, a dual-layer beamforming smart antenna is used in TDD_LTE systems, eight antennas sending and eight antennas receiving (8×8). However, not all the transmission modes need to use all eight antennas. For example, in a 2×2 multi-user (MIMO) mode only two antennas are used, while in a single-input and single-output system (SISO) mode only 1 antenna is used. Since in these modes specific antennas will not send any data at various times, the resource can not be used effectively, e.g., maximally.

Smart antenna beamforming is therefore not suitable for all transmission modes and conditions in LTE. For example, when radio conditions are sufficiently good and the number of users small, the system may not necessarily need to enable beamforming, so eight antennas are not necessary for sending data.

Typically, nodes using eight antennas to transmit SISO data and 2×2 MIMO data use two groups of 4 antennas. Such nodes may not fully use the space diversity gain, and as such may use more energy resources. What is needed is an effective way to schedule n antennas when less than n are needed (e.g., eight antennas when less than a maximum number of resources is needed, e.g., 2×2 MIMO or SISO). Effective scheduling of the antennas can improve downlink (DL) and uplink (UL) transmit diversity, create power savings, DL power control, interference reduction and signaling performance.

SUMMARY

In one of its aspects the technology disclosed herein concerns a method in a radio network node for dynamic antenna management of a multi-antenna structure, the multi-antenna structure comprising a set of n integer number of antennas with beamforming capability. In an example embodiment and mode the method comprises monitoring a condition of a radio network cell served by the radio network node and, if the monitored condition is less than or equal to a predetermined criteria, disabling a beamforming operation and managing a subset, less than n, of the set of n antennas according to a predetermined antenna hopping pattern.

In an example embodiment and mode, the monitored condition is a number of users in a radio network cell served by the radio network node, and the predetermined criteria is a predetermined number of users.

In an example embodiment and mode, the predetermined antenna hopping pattern includes sequential hops between non-sequential antennas.

In an example embodiment and mode, the beamforming operation is disabled and the subset managed for a time period t.

In an example embodiment and mode, after time period t, if the monitored condition exceeds or is equal to the predetermined criteria, the method further comprises disabling the antenna hopping pattern and enabling the beamforming operation.

In an example embodiment and mode, the method further comprises measuring radio network performance parameters and disabling the beamforming operation when both the monitored condition is less than or equal to a predetermined criteria and the measured radio network performance parameters exceed a radio network performance threshold.

In an example embodiment and mode, the network performance parameters include any of user channel quality and downlink quality.

In an example a single antenna input single antenna output (SISO) embodiment and mode, the subset includes one antenna.

In an example multiple-antenna input multiple-antenna output (MIMO) embodiment and mode, the subset includes multiple antennas formed as a group.

In an example M×M MIMO embodiment and mode, the predetermined antenna hopping pattern includes sequential hops between isolated or orthogonal groups of M antennas.

In an example M×M MIMO embodiment and mode, a different antenna is selected to receive and send user data.

In an example embodiment and mode, the radio network node is part of a TDD-LTE network.

In another of its aspects the technology disclosed herein concerns a method in a radio network node for dynamic antenna management of a multi-antenna structure. The multi-antenna structure comprises a set of an integer n number of antennas with beamforming capability. The method comprises monitoring a number of users Nu served by the radio network node and, if the monitored number of users Nu does not exceed a predetermined threshold and radio network performance parameters exceed a predetermined radio network performance threshold Np, switching off the beamforming operation and managing a subset, less than n, of the set of n antennas according to a predetermined antenna hopping pattern.

In an example embodiment and mode the method further comprises setting a timer for time period t when the beamforming operation is disabled and the subset is managed.

In an example embodiment and mode, if the beamforming operation is switched off, the method further comprises continuing to monitor the number of users Nu-off and starting a new timer, for time period tn, if Nu-off equals or exceeds a predetermined threshold and a network performance parameter is <Np, switching on the beamforming operation and disabling the predetermined antenna hopping pattern.

In an example embodiment and mode the predetermined antenna hopping pattern includes sequential hops between non-sequential antennas.

In an example embodiment and mode the network performance parameters include any of user channel quality and downlink quality.

In an example embodiment and mode, the network performance parameters include any of user channel quality indication (CQI), downlink block error rate (DL BLER) and downlink modulation and coding scheme (DL MCS).

In an example single antenna input single antenna output (SISO) embodiment and mode, the subset includes one antenna.

In an example multiple-antenna input multiple-antenna output (MIMO) embodiment and mode, the subset includes multiple antennas formed as a group.

In an example M×M MIMO embodiment and mode, the predetermined antenna hopping pattern includes sequential hops between well isolated or orthogonal groups of M antennas.

In an example embodiment and mode the radio network node is part of a TDD-LTE network.

In another of its aspects the technology disclosed herein concerns a radio network node which comprises a multi-antenna structure and electronic circuitry. The multi-antenna structure comprises a set of an integer n number antennas. The electronic circuitry is configured: to monitor a condition in a radio network cell served by the radio network node; to perform a beamforming operation for the set of antennas; and, if the monitored condition of users is less than or equal to a predetermined criteria, disable the beamforming operation and manage a subset, less than n, of the set of n antennas according to a predetermined antenna hopping pattern.

In an example embodiment the monitored condition is a number of users in a radio network cell served by the radio network node, and the predetermined criteria is a predetermined number of users.

In an example embodiment the electronic circuitry is further configured to disable the beamforming operation when both the monitored condition is less than or equal to a predetermined criteria and when radio network performance parameters exceed a radio network performance threshold.

In an example embodiment the network performance parameters include any of user channel quality and downlink quality.

In an example embodiment the node further comprises a node user monitor; a timer; a beamforming switch; and an antenna hopping sequence manager. The user monitor is configured to track a number of users in a radio network cell served by the radio network node. The timer is configured to set a time period when the tracked number of users is less than or equal to a predetermined number of users. The beamforming switch, responsive to the setting of the timer, is configured to switch off the beamforming operation for the time period. The antenna hopping sequence manager is configured, during the time period t, to manage the subset of antennas according to the predetermined antenna hopping pattern.

In an example embodiment the predetermined antenna hopping pattern includes sequential hops between non-sequential antennas.

In an example single antenna input single antenna output (SISO) embodiment, the subset includes one antenna.

In an example multiple-antenna input multiple-antenna output (MIMO) embodiment, the subset includes multiple antennas formed as a group.

In an example M×M MIMO embodiment, the predetermined antenna hopping pattern includes sequential hops between isolated or orthogonal groups of M antennas.

In an example MIMO embodiment, a different antenna is selected to receive and send user data.

In an example embodiment, the radio network node is part of a TDD-LTE network.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network comprising network nodes using any technology including, e.g., high speed packet access (HSPA), long term evolution (LTE), code division multiple access (CDMA)2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Figure 1:
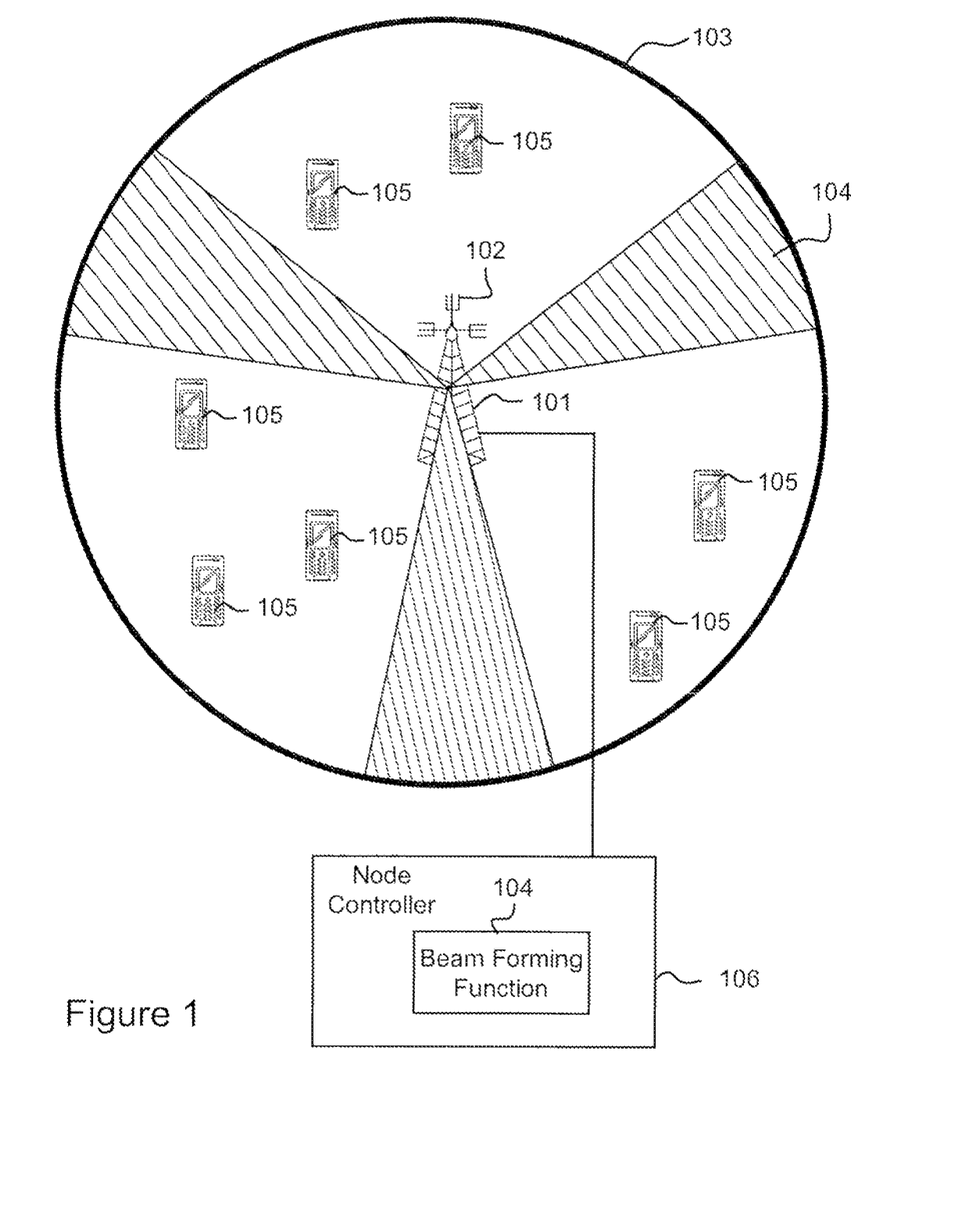
FIG. 1 is a diagrammatic view illustrating an example embodiment of a basic radio communications system.

FIG. 1 illustrates a basic radio communications structure including node 101 which generally provides transmission/reception of radio signals through multi-antenna structure 102 controlled by node controller 106. The node 101 creates cell coverage area 103 in which a plurality of user equipment (UE) 105, e.g., wireless terminals (telephones), communicate through downlink (DL) and uplink signals (UL). The node controller 106 comprises, or works in conjunction with, beamforming function 104.

Figure 2:
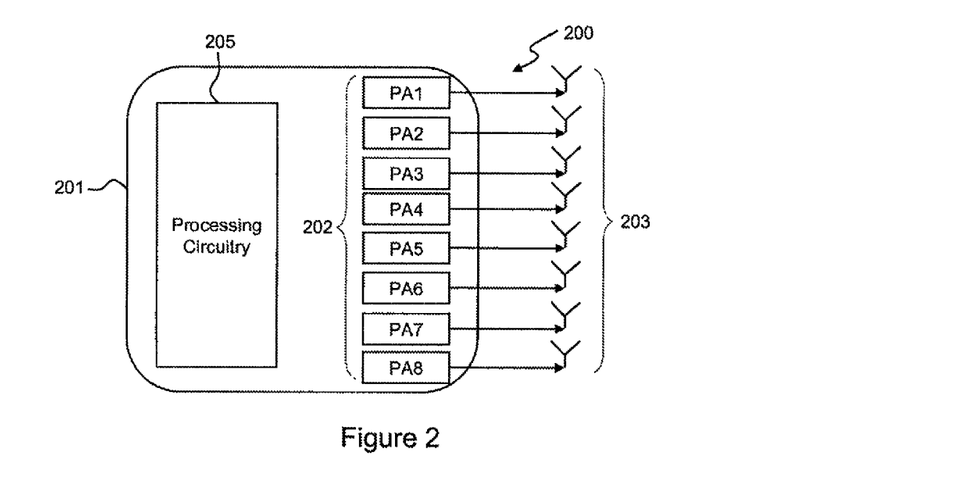
FIG. 2 is a diagrammatic view illustrating an example embodiment of a multi-antenna structure.

FIG. 2 illustrates an example, basic multi-antenna structure 200. The multi-antenna structure 200 includes processing circuitry 205 located within radio remote unit (RRU) 201 and power amplifiers (PAs) 202 (PA1-PA8) which control amplification of radio signals for transmission as well as those received by respective antennas 203. By way of example, eight power amplifiers 202 and eight antennas are illustrated in FIG. 2, although it should be understood that a greater or lesser number may comprise the multi-antenna structure 200. Thus, the multi-antenna structure 200 shown in FIG. 2 is not meant to fully describe all hardware and software aspects of a multi-antenna structure and should not be limited thereto.

The user equipment (UE) may be called by other names and comprise different types of equipment. For example, the user equipment (UE) can also be called a mobile station, wireless station, wireless terminal, and can be equipment such as a mobile telephone ("cellular" telephone) and a laptop with mobile termination, and thus can be, for example, portable, pocket, hand-held, computer-included, or car-mounted mobile devices which communicate voice and/or data with the radio access network.

In a non-limiting embodiment, when network users' (e.g., UEs 105) wireless devices are using transmission modes which do not require full use of all of the antennas of multi-antenna structure 200 (FIG. 2), and when traffic load is suitably low and the radio environment is sufficiently good, the node 101 (e.g., base station) may determine whether or not to disable beamforming function 104, and thereby a beamforming capability, e.g., a beamforming operation, of node 101. That is, the node 101 may determine not to use all available plural antennas of multi-antenna structure 200, but instead utilize a subset of the antennas. By way of example, FIG. 1 shows beamforming function 104 as comprising a unit or functionality of node controller 106 which, when implemented, performs a beamforming operation which affects, e.g., the signal processing techniques used to directionally shape antenna transmission patterns of the antennas of multi-antenna structure 200 to avoid interference.

In a basic example embodiment, a condition ("monitored condition") of a radio network cell served by the radio network node is monitored. If the monitored condition is less than or equal to a predetermined criteria, the beamforming operation is disabled and a subset of antennas of multi-antenna structure 200 is managed according to a predetermined antenna hopping pattern. In some example implementations, the beamforming function/operation is disabled and the antenna hopping management of the subset occurs when both the monitored condition is less than or equal to a predetermined criteria and the measured radio network performance parameters exceed a radio network performance threshold. In an example implementation, the monitored condition is a number of users in a radio network cell served by the radio network node, and the predetermined criteria is a predetermined number of users.

It has been mentioned above that when traffic load is suitably low and the radio environment is sufficiently good, the node 101 (e.g., base station) may determine whether or not to disable beamforming function 104, and thereby disable the beamforming operation of node 101. What constitute suitably low traffic load and sufficiently good radio environment may be established or defined with reference to one or more thresholds for one or more corresponding network performance parameters (examples being listed herein). Such thresholds may be set by a network operator and consequently stored or otherwise made available for consultation and checking.

Figure 3:
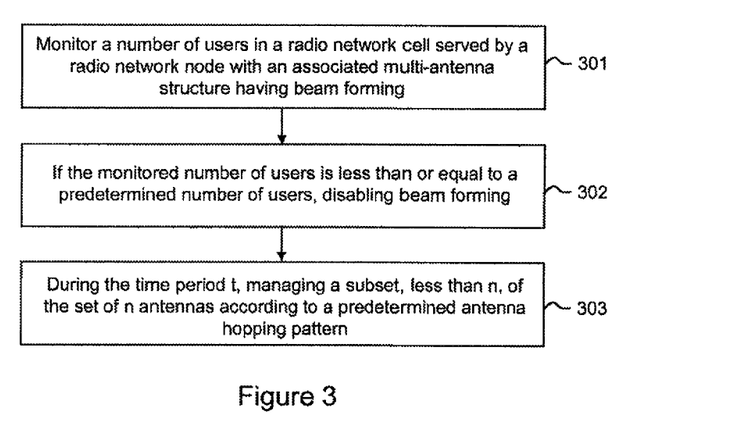
FIG. 3 is a flowchart showing example basic acts or steps included in a method of operating a multi-antenna structure of a node according to an example embodiment.

FIG. 3 illustrates a non-limiting embodiment of the technology described herein, and particularly shows basic example acts or steps of operating a node (e.g., such as a base station) for efficiently managing a multi-antenna group or multi-antenna structure 200. Act 301 comprises monitoring the number of users (UEs) 105 in radio network cell coverage area 103. Such monitoring may comprise, for example, the counting of the users (UEs). Act 302 comprises disabling the beamforming function 104 if the number monitored of users is less than or equal to a predetermined number of users. By disabling the beamforming function 104 is meant that signal processing techniques used to directionally shape antenna transmission patterns to avoid interference are at least temporarily halted. Act 303 comprises managing a subset (e.g., 1, 2, 4, etc.) of the antenna elements 202/203 of multi-antenna structure 200 according to a predetermined antenna hopping pattern. Such management may occur during a time period t which is based on operation of a timer.

In a non-limiting example, when network users' (UEs) are using SISO and/or 2×2 MIMO transmission modes, when traffic load is suitably low and radio environment good, the node (e.g., base station) can disable the beamforming function 104. When the beamforming function 104 is disabled, at any given time a subset of the plural antennas of multi-antenna structure 200, less than the full antenna set, is used during transmission or reception. In the SISO mode, the subset of the antennas of multi-antenna structure 200 used for transmission and receiving is one antenna; in the 2×2 MIMO mode the subset of the antennas of multi-antenna structure 200 used for transmission and receiving is two antennas.

In an example embodiment, which antenna(s) of the multi-antenna structure 200 constitute the subset at any point in time, e.g., for any particular system frame of data, is determined in accordance with a hopping pattern. In other words, the technology described herein changes the antenna indexes for antenna hopping purposes every system frame number (SFN). In some radio access technologies, each frame is serially numbered by a System Frame Number (SFN), which is used to identify the framing and timing, e.g., of a base station, and which in some technologies has a value ranging from 0 to 4,095. As a result of the antenna index changing every system frame number (SFN), the DL and UL user data transmission/reception hops between the plural antennas of multi-antenna structure 200 according to a hopping technique or algorithm. A radio remote unit (connecting PAs to antennas) will also switch on or bypass the appropriate antenna PA, according to an antenna mapping at that time. If a specific antenna is selected in the antenna hopping pattern, the related power amplifier (PA) in the RRU will be switched on or bypassed.

In an example embodiment, it is possible to switch antenna hopping on or off on a per cell basis. A node (e.g., base station) may adaptively allocate user data transmission on different antennas using the hopping techniques or algorithms. With antenna hopping, transmit diversity is introduced by altering transmit antennas between system frame numbers (SFN). Therefore the technology described herein may reduce downlink (DL) transmission power, reduce interference between cells, improve space diversity gain, ensure assigning the most efficient resource to each user, and reach a goal of optimal performance of LTE system.

Table 1 provides a basis for understanding of at least some of the terminology employed herein.

TABLE 1

| Term(s) | Meaning/explanation |
| --- | --- |
| Nu = Nu__in (initial) | Number of users monitored when the beamforming feature is on |
| Nu threshold = Nu__in__threshold (initial): | Number of users threshold to switch off beamforming |
| T = Tin__hold | A timer (e.g., units = seconds) starts when Nu <= Nu threshold |
| T threshold | time threshold to switch off beamforming |
| Np threshold = Threshold__in (initial) | network performance parameter threshold set to trigger to switch off beamforming, including CQI, DL BLER, DL MCS when representing a sufficiently good network condition |
| Nu__out | number of users monitored by node (e.g., eNB) when beamforming feature is off |
| Nu__out__threshold | Tout__hold: a timer (e.g., units = seconds) is started when Nu__out >= Nu__out__threshold |

TABLE 1-continued

Terminology

| Term(s) | Meaning/explanation |
|---|---|
| Tout_threshold | time threshold to switch off beamforming |
| threshhold_out | network performance parameter threshold set to trigger to switch on beamforming, including CQI, DL BLER, DL MCS and threshhold_out has different value from Threshold_in when low quality network condition exists |

In an example embodiment, network performance parameters may include such parameters as user channel quality indication (CQI) reports, DL block error rates (BLERs), and DL modulation and coding scheme (MCS), each being above related a corresponding predetermined threshold. The number of users threshold (Nu threshold) and the network parameter threshold (Np threshold) may be set by a network operator according to network load conditions. Similarly Nu_out_threshold and Tout_threshold can be set by a network operator according to network load conditions.

Figure 4:
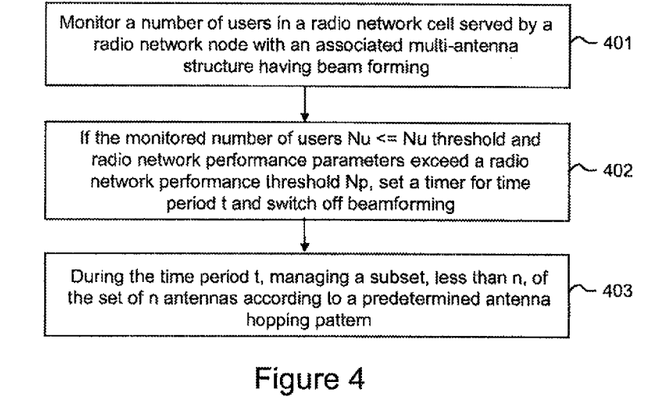
FIG. 4 is a flowchart showing example basic acts or steps included in a dynamic antenna management process for a multi-antenna structure according to an example embodiment.

FIG. 4 illustrates an example, non-limiting embodiment of a dynamic antenna management process for a multi-antenna structure. After initial cell setup and node (e.g., eNodeB) startup, the dynamic antenna management feature is switched on. Act 401 comprises monitoring a number of users (UEs) in radio network cell coverage area (e.g., counted). Act 402 comprises switching off beamforming and setting (e.g., initializing) a timer T for an initial time period if the monitored number of users (Nu) is less than or equal to a number of users threshold (Nu threshold) and if one or more radio parameters exceed a radio network performance threshold (Np). Act 403 comprises the dynamic antenna management system managing a subset of antenna(s) of multi-antenna structure 200 according to a predetermined hopping pattern. For a set of n number of antennas comprising multi-antenna structure 200, the subset is less than the number n.

Figure 5:
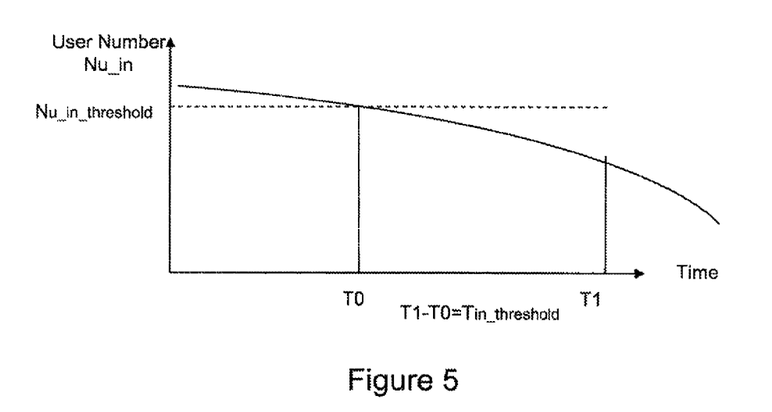
FIG. 5 is a graph showing, e.g., a number of users (NU_in) falling below number a user threshold Nu_in_threshold in a time period from time T0 to time T1.

FIG. 5 illustrates a time period t from time T0 to time T1, and the number of users (NU_in) falling below number of user threshold Nu_in_threshold. At time T1, the node controller 106 turns off the beamforming function 104 and begins the antenna hopping procedure described herein.

Figure 6:
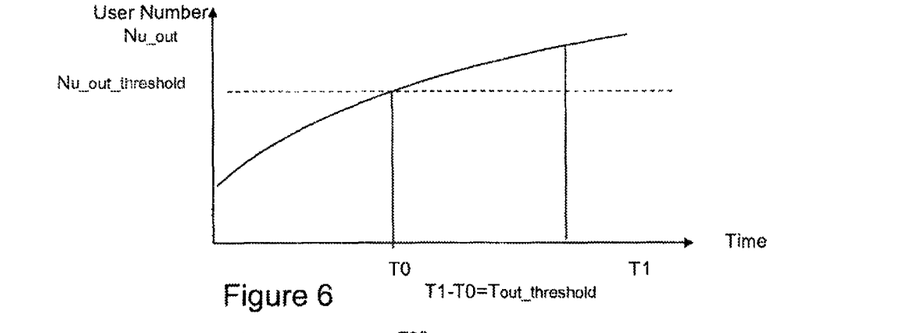
FIG. 6 is a graph showing, e.g., a number of users (NU_out) rising above a number of user threshold Nu_out_threshold in a time period from time T0 to time T1.

In one non-limiting example aspect, while the beamforming feature is turned off, the node continues to monitor the number of users during beamforming outage (Nu_out). A new timer is started for the beamforming outage time period, e.g., timer Tout_hold. If the number of users during beamforming outage (Nu_out) is equal to or greater than a threshold (Nu_out_threshold), and the timer Tout_hold equals or exceeds a threshold Tout_threshold, and one or more of the network performance parameters falls below a related threshold_out, the beamforming feature is switched on. Such is illustrated by FIG. 6, which shows a time period t from time T0 to time T1, and wherein a number of users during the beamforming outage (NU_out) reaches or rises above the number of user threshold Nu_out_threshold. At time T1 in FIG. 6 the node controller 106 turns on beamforming function 104.

SISO Mode Examples

In a non-limiting example, if users (UEs) are in SISO mode, during the beamforming outage only one antenna and power amplifier (PA) switch will be on for a short period (e.g., 10 ms). During the beamforming outage the transmission antenna index P changes according to a sequence (hopping pattern). The specific sequence may be defined or otherwise specified by a baseband or system designer, and preferably follows a principle that the next hop of antenna used is well isolated or orthogonal with the current antenna usage.

Table 2 below illustrates an example of a hopping pattern for an SISO example, wherein antenna index P changes every sequence frame number (SFN). In particular, for each quantity (SFN mod 8) a different antenna is utilized in accordance with Table 2.

TABLE 2

Antenna Hopping for SISO example embodiment

| | (SFN mod 8) | | | | | | | |
|---|---|---|---|---|---|---|---|---|
| | 0 | 1 | 2 | 3 | 4 | 5 | 6 | 7 |
| Antenna index P | 1 | 4 | 2 | 5 | 3 | 6 | 4 | 7 |

Figure 7A:
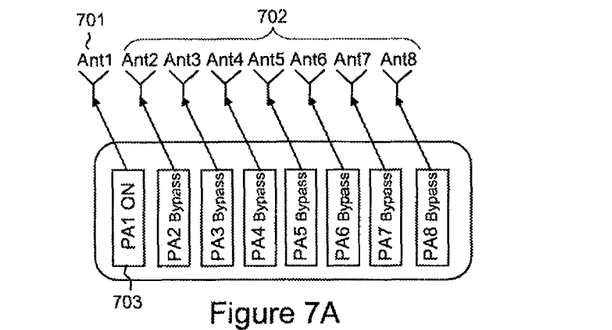
FIG. 7A and FIG. 7B are diagrammatic views illustrating usage of different antennas for different SFNs in a SISO example embodiment.

FIG. 7A illustrates the eight antenna configuration of FIG. 2 with SFN mod 8=0. Using the antenna index table (SFN mod 8), all antennas 702 will be off (bypassed) except for antenna 1 (e.g., antenna 701) which through power amplifier PA1 703 will be on.

Figure 7B:
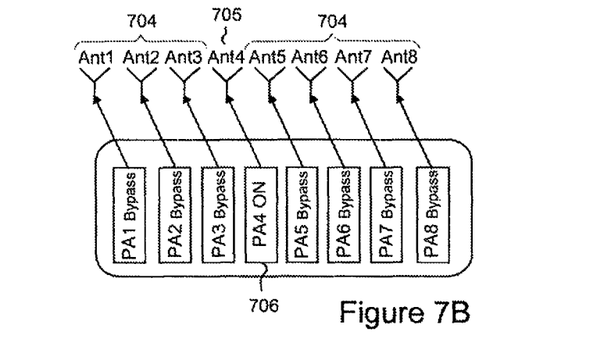

FIG. 7B illustrates the eight antenna configuration of FIG. 2 with SFN mod 8=1. Using the antenna index table (SFN mod 8), all antennas 704 will be off (bypassed) except for antenna 4 (e.g., antenna 705) which through power amplifier PA4 706 will be on.

MIMO Mode Examples

In a non-limiting example embodiment, if users (UEs) are in MIMO mode, a subset (e.g., two or more but not all of the antennas) of multi-antenna structure 200 may be employed. In an example implementation, the subset for a MIMO mode may be two antennas, so that two (different) antennas and their respective power amplifiers (PA) switch on every SFN. For such MIMO mode example implementation there may be two transmission antenna indices, P1 and P2, which point to the two corresponding antennas which are turned on for a given SFN. Transmission antenna indices P1 and P2 change according a predefined sequence, such as that illustrated by way of example in Table 2. Preferably the antenna hopping pattern or principle provides that the next antenna group is well isolated from the current group to avoid interference between antennas. As previously stated, the hopping sequence can be defined or otherwise specified by the baseband or system designer. As understood from the foregoing and the example of Table 3, the transmission antenna indices P1 and P2 change every SFN.

TABLE 3

Antenna Hopping for MIMO example embodiment

| (SFN mod 4) | 0 | 1 | 2 | 3 |
|---|---|---|---|---|
| Antenna index P1 | 1 | 3 | 2 | 4 |
| Antenna index P2 | 5 | 7 | 6 | 8 |

Figure 8A:
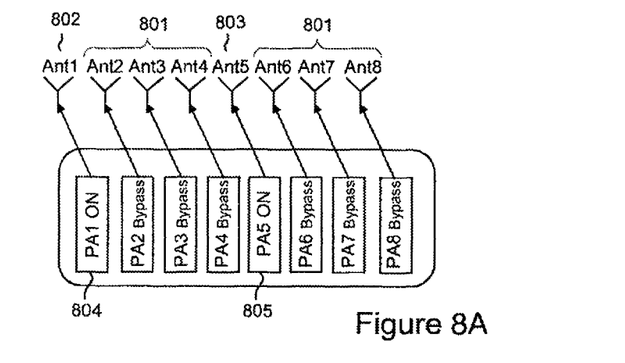
FIG. 8A and FIG. 8B are diagrammatic views illustrating usage of different antennas for different SFNs in a MIMO example embodiment.

FIG. 8A illustrates the eight antenna configuration of FIG. 2 when SFN mod 4=0. Using the antenna index table (SFN mod 4), all antennas 801 will be off (bypassed) except for antenna 1 (e.g., antenna 802) and antenna 5 (e.g., antenna 803) which through respective power amplifiers PA1 804 and PA5 805 will be on.

Figure 8B:
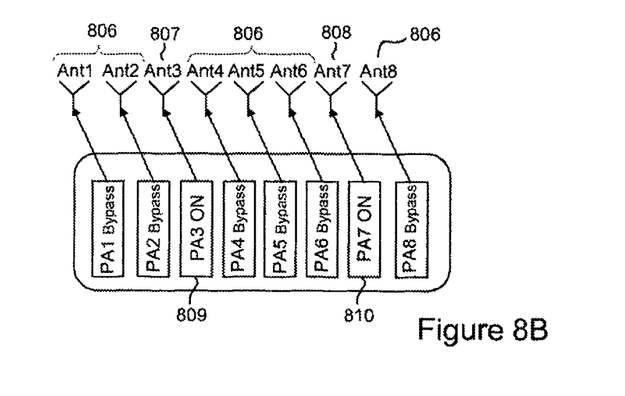

FIG. 8B illustrates the eight antenna configuration of FIG. 2 when SFN mod 4=1. Using the antenna index table (SFN mod 4), all antennas 806 will be off (bypassed) except for antenna 3 (e.g., antenna 807) and antenna 7 (e.g., antenna 808) which through respective power amplifiers PA3 809 and PA7 810 will be on.

According to hopping sequence(s) described and/or illustrated herein, for each different SFN value the eNodeB will use a different antenna (or combination of antennas) to receive and send user data, thereby providing more space diversity gain to both the downlink (DL) and uplink (UL) signals.

Figure 9:
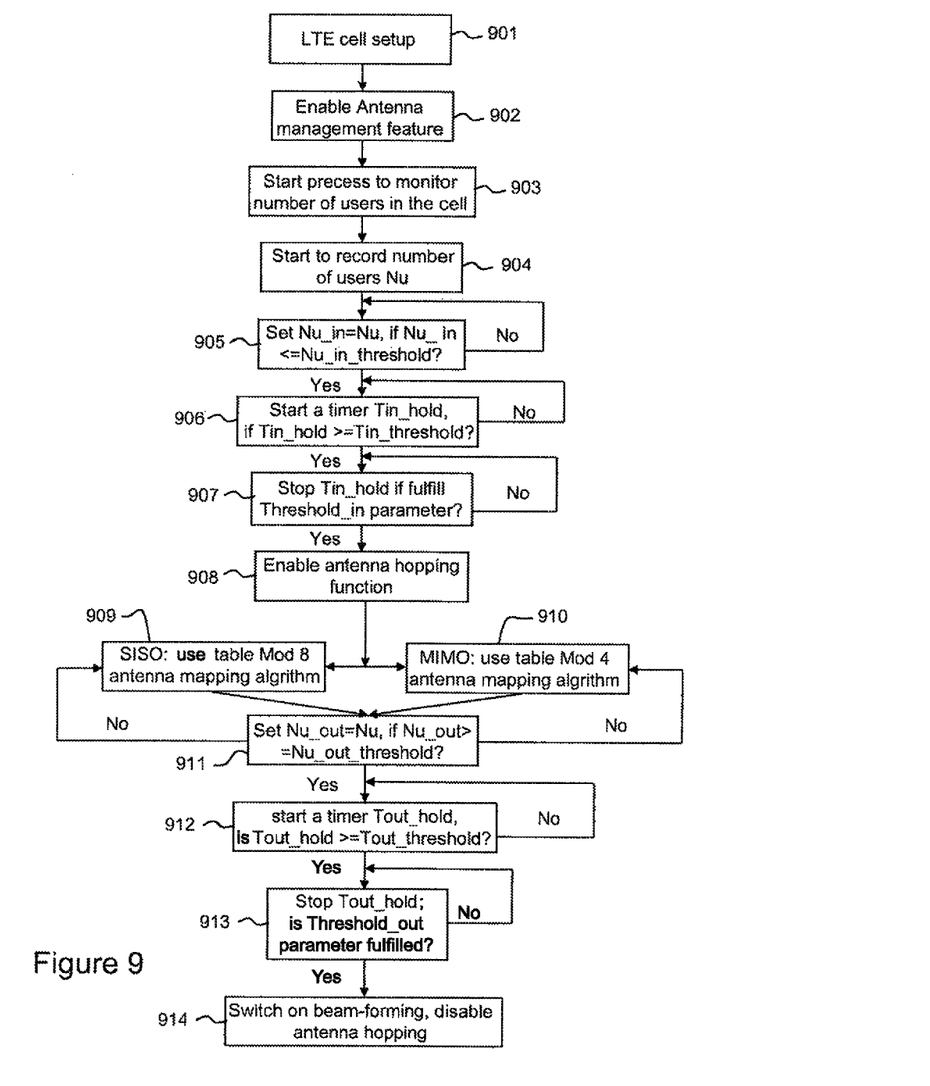
FIG. 9 is a flowchart showing example more detailed acts or steps included in a dynamic antenna management process for a multi-antenna structure according to an example embodiment.

FIG. 9 shows example acts or steps which are executed by, e.g., a node controller, in conjunction with the technology described herein for both the SISO and MIMO example modes. Act 901 comprises setting up the cell, which in an example embodiment may be a LTE cell, for example. Act 902 comprises turning on the dynamic antenna management feature. Act 903 comprises the node (e.g., EnodeB) starting a process to monitor the number of users Nu in the cell. Act 904 comprises recording the number of users Nu in the cell. Act 905 comprises initially setting Nu_in equal to Nu and monitoring Nu_in. When Nu_in is less than or equal to Nu_in_threshold, operation continues to Act 906. Act 906 comprises staring a timer Tin_hold and monitoring Tin_hold. When Tin_hold is greater than or equal to Tin_threshold, operation continues with Act 907. Act 907 comprises stopping the timer Tin_hold if the Threshold_in parameter is fulfilled. Thereafter, as act 908, the antenna hopping function is enabled. As depicted by alternate acts 909 and 910, respectively, either an SISO antenna hopping technique or a MIMO antenna hopping technique is employed. During performance of the antenna hopping, as Act 911, Nu_out is initially set to Nu and Nu_out is then monitored. So long as Nu_out does not equal or exceed Nu_out_threshold, the antenna hopping continues. But when Nu_out equals or exceeds Nu_out_threshold, Nu_out is set to Nu, and act 912 is performed. Act 912 comprises starting a timer Tout_hold and monitoring Tout_hold. When Tout_hold equals or exceeds Tout_threshold, operation continues to Act 913 and the timer Tout-hold is stopped. At Act 913, the Threshold_out parameter is checked. When the Threshold_out_parameter is satisfied, act 914 is performed. Act 914 comprises switching on the beamforming function 104 and disabling the antenna hopping.

Figure 10:
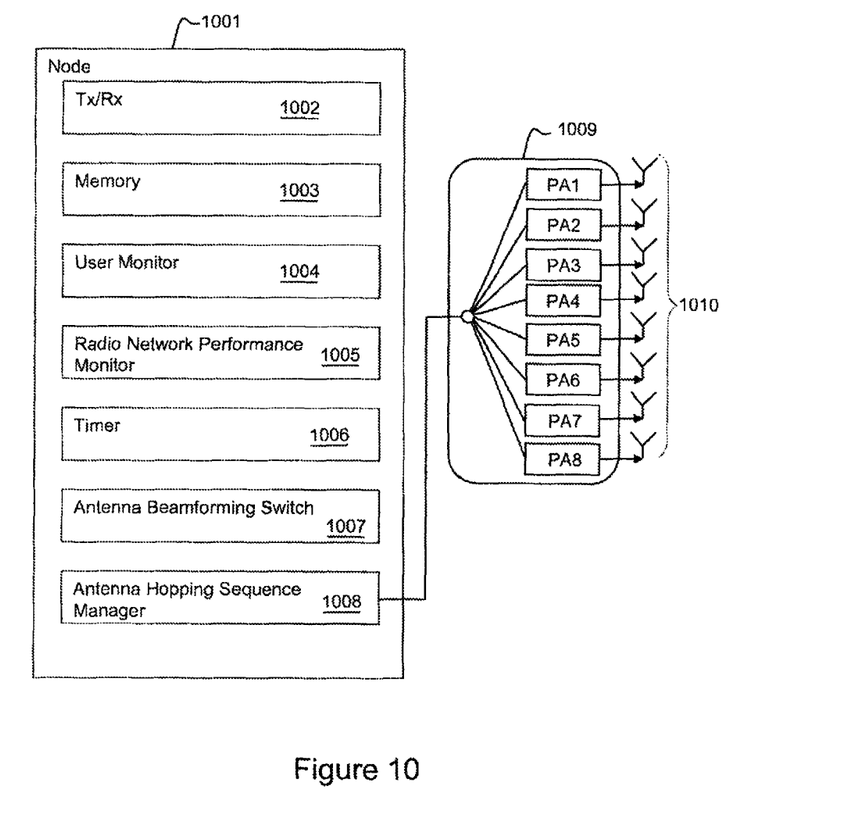
FIG. 10 is a diagrammatic view of a node arranged to perform a dynamic antenna management process for a multi-antenna structure according to an example embodiment.

FIG. 10 shows an example node 1001 arranged to implement the technology described herein. Node 1001 includes, but is not limited to: a transmitter/receiver 1002; node memory 1003; user monitor 1004 (for recording of number of users); radio network performance monitor 1005 (to monitor the quality of network conditions); timer 1006 (to implement the various monitoring time periods described herein); antenna beamforming switch 1007 (to turn beamforming on/off); and antenna hopping sequence manager (dynamic antenna manager) 1008. The antenna hopping sequence manager 1008 uses the predetermined sequences to selectively turn on/off selected antennas through RRU 1009 with power amplifiers (PA) connected to antennas 1010. One or more of the aforementioned elements of node 1001 may comprise or be realized by node controller 106, and thereby or by other realization may have hardware implementation such as by a controller, processor. A computer implementation for realizing the elements of the node 1001 may comprise, for example, a processor(s) and memory (which in turn can comprise a random access memory; a read only memory; and a application memory (a non-transitory computer readable medium which stores, e.g., coded instructions which can be executed by the processor to perform acts described herein), and any other memory such as cache memory, for example)

Advantageously, the technology described herein reduces interference between cells because of reduced transmission power; increases space diversity gain for DL and UL signals by altering transmit antennas between SFNs (thereby improving space resource usage); randomizes interference from wireless channels; saves system power and enhances overall cell throughput.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method in a radio network node for dynamic antenna management of a multi-antenna structure, the multi-antenna structure comprising a set of n integer number of antennas with beamforming capability, the method comprising:
   monitoring a condition of a radio network cell served by the radio network node;
   if the monitored condition is less than or equal to a predetermined criteria for a first duration, disabling a beamforming operation and managing a subset, less than n, of the set of n antennas according to a predetermined antenna hopping pattern;
   if the monitored condition exceeds or is equal to the predetermined criteria for a second duration, disabling the antenna hopping pattern and enabling the beamforming operation;
   measuring radio network performance parameters; and
   when both the monitored condition is less than or equal to a predetermined criteria and the measured radio network performance parameters exceed a radio network performance threshold, disabling the beamforming operation.

2. The method of claim 1, wherein the monitored condition is a number of users in a radio network cell served by the radio network node, and wherein the predetermined criteria is a predetermined number of users.

3. The method of claim 1, wherein the predetermined antenna hopping pattern includes sequential hops between non-sequential antennas.

4. The method of claim 1, wherein the network performance parameters include any of user channel quality and downlink quality.

5. The method of claim 1, wherein, in a single antenna input single antenna output (SISO) mode, the subset includes one antenna.

6. The method of claim 1, wherein, in a multiple-antenna input multiple-antenna output (MIMO) mode, the subset includes multiple antennas formed as a group.

7. The method of claim 6, wherein, in an M×M MIMO mode, the predetermined antenna hopping pattern includes sequential hops between isolated or orthogonal groups of M antennas.

8. The method of claim 6, wherein, in a MIMO mode, a different antenna is selected to receive and send user data.

9. The method of claim 1, wherein the radio network node is part of a TDD-LTE network.

10. A method in a radio network node for dynamic antenna management of a multi-antenna structure, the multi-antenna structure comprising a set of an integer n number of antennas with beamforming capability, the method comprising:
monitoring a number of users Nu served by the radio network node;
measuring radio network performance parameters;
if both the monitored number of users Nu does not exceed a predetermined threshold and measured radio network performance parameters exceed a predetermined radio network performance threshold Np for a first duration:
switching off the beamforming operation and
managing a subset, less than n, of the set of n antennas according to a predetermined antenna hopping pattern; and
if Nu equals or exceeds the predetermined threshold and the radio network performance parameters are less than Np for a second duration, switching on the beamforming operation and disabling the predetermined antenna hopping pattern.

11. The method of claim 10, further comprising setting a timer for time period t when the beamforming operation is disabled and the subset is managed.

12. The method of claim 11 wherein, if the beamforming operation is switched off, continuing to monitor the number of users Nu-off and starting a new timer, for time period tn, if Nu-off equals or exceeds a predetermined threshold and a network performance parameter is <Np, switching on the beamforming operation and disabling the predetermined antenna hopping pattern.

13. The method of claim 10, wherein, the predetermined antenna hopping pattern includes sequential hops between non-sequential antennas.

14. The method of claim 10, wherein the network performance parameters include any of user channel quality and downlink quality.

15. The method of claim 10, wherein the network performance parameters include any of user channel quality indication (CQI), downlink block error rate (DL BLER) and downlink modulation and coding scheme (DL MCS).

16. The method of claim 10, wherein, in a single antenna input single antenna output (SISO) mode, the subset includes one antenna.

17. The method of claim 10, wherein, in a multiple-antenna input multiple-antenna output (MIMO) mode, the subset includes multiple antennas formed as a group.

18. The method of claim 17, wherein, in an M×M MIMO mode, the predetermined antenna hopping pattern includes sequential hops between well isolated or orthogonal groups of M antennas.

19. The method of claim 10, wherein the radio network node is part of a TDD-LTE network.

20. A radio network node comprising:
a multi-antenna structure comprising a set of an integer n number antennas;
electronic circuitry configured to:
monitor a condition in a radio network cell served by the radio network node;
perform a beamforming operation for the set of antennas;
if the monitored condition of users is less than or equal to a predetermined criteria for a first duration, disable the beamforming operation and manage a subset, less than n, of the set of n antennas according to a predetermined antenna hopping pattern;
if the monitored condition exceeds or is equal to the predetermined criteria for a second duration, disable the antenna hopping pattern and enable the beamforming operation;
measure radio network performance parameters; and
when both the monitored condition is less than or equal to a predetermined criteria and when radio network performance parameters exceed a radio network performance threshold, disable the beamforming operation.

21. The node of claim 20, wherein the monitored condition is a number of users in a radio network cell served by the radio network node, and wherein the predetermined criteria is a predetermined number of users.

22. The node of claim 21, wherein the electronic circuitry is further configured to set a time period when the tracked number of users is less than or equal to a predetermined number of users.

23. The node of claim 20, wherein the network performance parameters include any of user channel quality and downlink quality.

24. The node of claim 20, wherein the predetermined antenna hopping pattern includes sequential hops between non-sequential antennas.

25. The node of claim 20, wherein, in a single antenna input single antenna output (SISO) mode, the subset includes one antenna.

26. The node of claim 20, wherein, in a multiple-antenna input multiple-antenna output (MIMO) mode, the subset includes multiple antennas formed as a group.

27. The node of claim 26, wherein, in an M×M MIMO mode, the predetermined antenna hopping pattern includes sequential hops between isolated or orthogonal groups of M antennas.

28. The node of claim 26, wherein, in a MIMO mode, a different antenna is selected to receive and send user data.

29. The node of claim 20, wherein the radio network node is part of a TDD-LTE network.

\* \* \* \* \*